United States Patent [19]

Tisbo et al.

[11] 4,352,888
[45] Oct. 5, 1982

[54] CONTAINER FOR HOLDING ORGANIC MATTER DURING DECOMPOSITION

[75] Inventors: Cosmo N. Tisbo; Thomas A. Tisbo, both of Barrington, Ill.

[73] Assignee: Custom Plastics, Inc., Elk Grove Village, Ill.

[21] Appl. No.: 333,701

[22] Filed: Dec. 23, 1981

[51] Int. Cl.³ .............................................. C12M 1/00
[52] U.S. Cl. .................................... 435/287; 435/299; 435/809; 435/819; 422/184; 220/4 F; 71/9; 71/901
[58] Field of Search .................. 220/4 F, 18; 435/287, 435/298, 299, 809, 813, 818, 819; 422/184; 71/8-10, 23, 901

[56] References Cited

U.S. PATENT DOCUMENTS

| | | | |
|---|---|---|---|
| 4,105,412 | 8/1978 | Petzinger | 71/901 X |
| 4,108,609 | 8/1978 | Petzinger | 71/901 X |
| 4,125,394 | 11/1978 | Wilson | 71/901 X |

*Primary Examiner*—Ferris H. Lander
*Attorney, Agent, or Firm*—Anthony S. Zummer

[57] ABSTRACT

The present invention relates to a plastic container for holding organic matter during decomposition of the organic matter. The container includes a lower section. The lower section includes a plurality of flat sides positioned in a substantially vertical attitude. The flat sides are joined at opposite edges to form a closed figure having an open bottom. An upper section is mounted on the lower section. The upper section includes a number of flat sides equal in number to the flat sides in the lower section. The flat sides of the upper section are positioned in a substantially vertical attitude and joined at opposite ends to form a closed figure. Each of the flat sides of the upper section is connected to a respective flat side of a lower section. Each of the flat sides of the upper and lower sections has a rectangular outline. Each flat side has a bead along a vertical edge and an elongated socket formed integral with the opposite vertical edge. Each socket is adapted for slidably receiving the bead of a like flat side for interconnecting the flat sides. Each of the flat sides has a plurality of horizontal recesses with a vent in each of the recesses to allow gases to pass from one side of the flat side to the other side of the flat side. Each flat side has an indentation in its upper edge and a ridge formed in the indentation in the flat side. Each flat side has a flexible ear formed integral with its lower edge, which ear is mateably lockably positionable in the indentation of a like flat side. Each ear has a groove for mateably receiving the ridge in the indentation for locking to each other vertically aligned flat sides. The container includes a cover removably mounted on the upper edge of the upper section.

12 Claims, 11 Drawing Figures

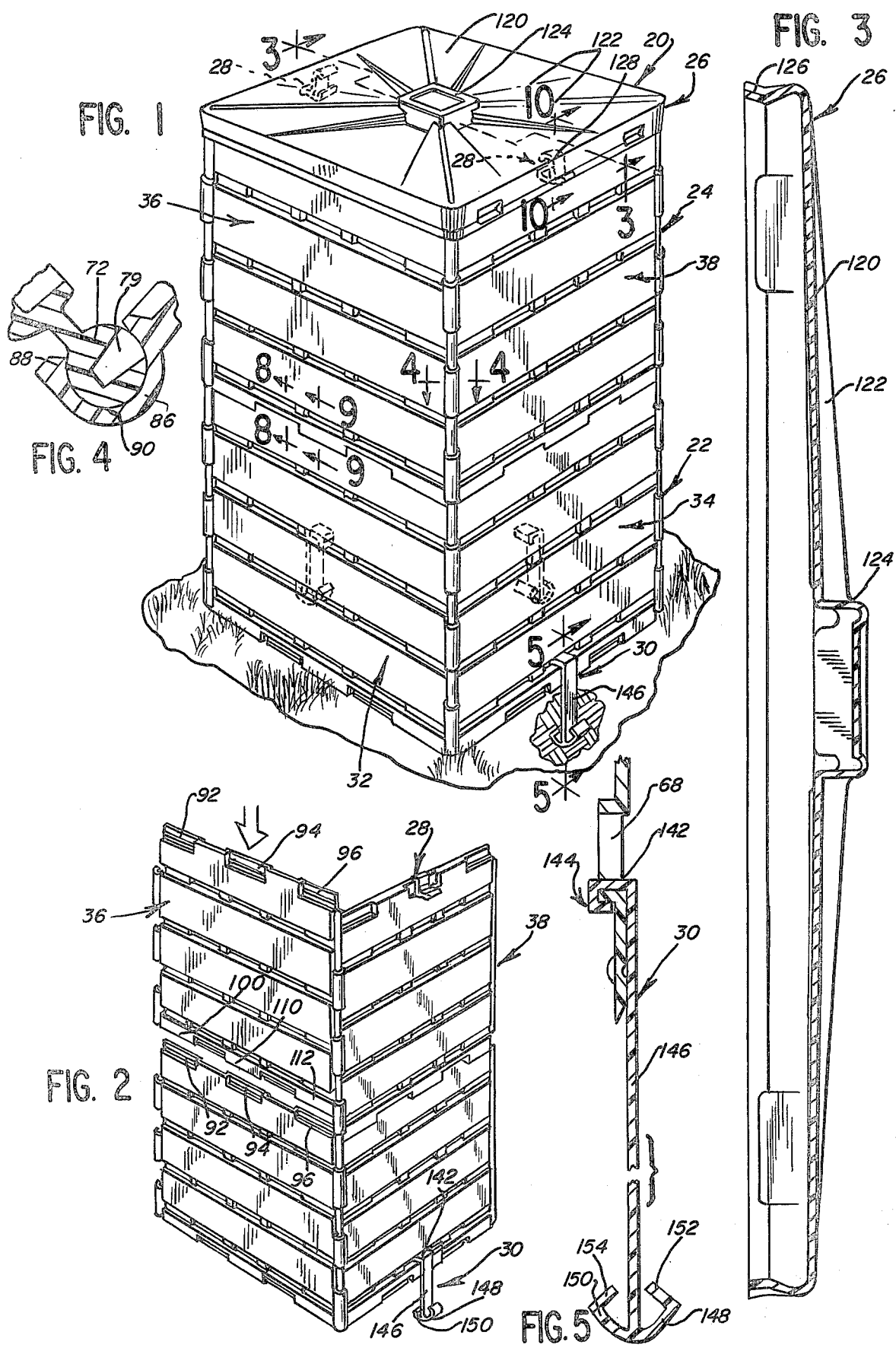

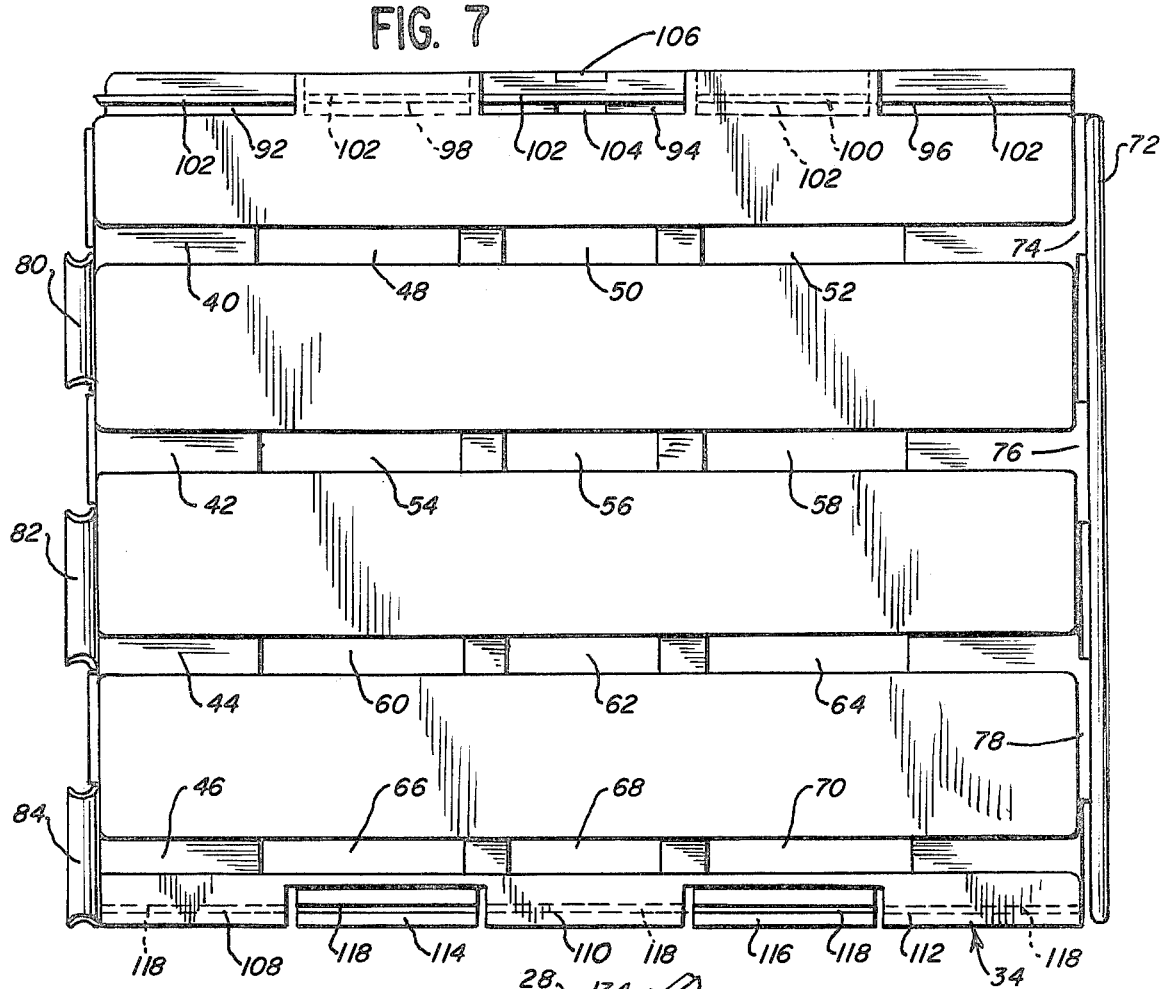
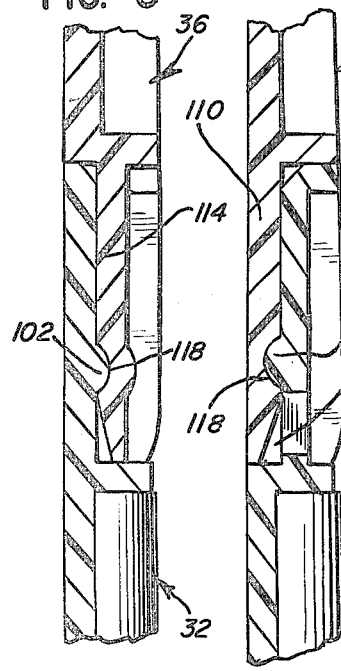
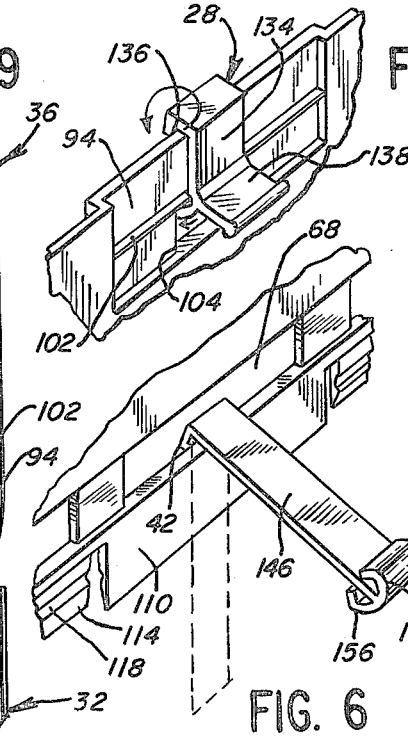
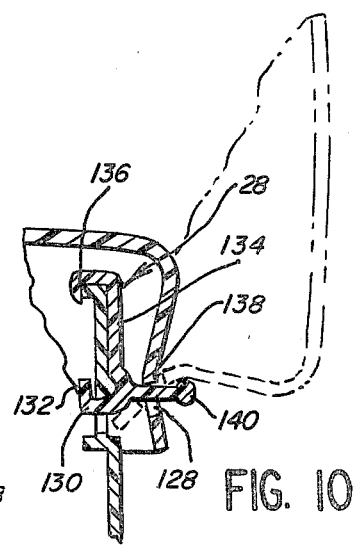

CONTAINER FOR HOLDING ORGANIC MATTER DURING DECOMPOSITION

BACKGROUND OF THE INVENTION

The utilization of compost as a fertilizer in a garden has been appreciated for a long time. The traditional compost heap, which is developed by many gardeners utilizes a considerable amount of space since the materials are simply piled on the heap. In addition to utilizing space in a garden, a compost heap is usually unsightly.

It has been recognized that it is desirable to provide a container for holding organic matter arranged vertically so that a quantity of organic matter may be allowed to decompose in the container. By placing the organic matter in the container, the organic matter has a silo effect so that the matter on the bottom is allowed to decompose quickly. As is often necessary with a compost heap, it is desirable to aerate the compost heap. The material in the container may be aerated by providing apertures in the side walls to allow gases to flow through the side walls for beneficial aeration. A container for organic matter, which matter is to decompose is taught in U.S. Pat. No. 4,125,394, issued Nov. 14, 1978, to Clifford A. Wilson and entitled "Compost Bin With Slidable Panels."

The known compost containers are limited in their size, that is; once the container is set up it has a single size. If it is necessary to utilize additional matter, another container must be provided for additional compost. It is recognized that it is desirable to provide a compost container which may be built up in a vertical direction to receive additional compost material. Thereby, a compost container does not take any additional horizontal space. Furthermore, it may be appreciated that it is desirable to have a compost container made of non-deteriorating plastic, thus it is desirable to provide a compost container which is built up of plastic sides which may easily be handled and easily shipped.

A further problem which accompanies known compost containers is that, a wind will often blow off a cover for the container and thereby expose the material contained in the compost container. If the container is filled, the wind may blow the materials about the area surrounding the compost container. In addition, it is desirable to provide a construction wherein a compost container is secured to the supporting surface, so that winds will not topple the container and allow the contents to be blown about the surrounding area.

SUMMARY OF THE INVENTION

The present invention relates to an improved plastic container for holding organic matter during decomposition of the organic matter. The plastic container is made up of vertically aligned sections. A lower section includes a plurality of flat sides positioned in a substantially vertical attitude and joined at opposite edges to form a closed figure having an open bottom. An upper section includes an equal number of flat sides as the lower section. The shape of the flat sides of each of the sections is generally rectangular. Each flat side includes a bead formed integral with a vertical edge and an elongated socket formed integral with the opposite vertical edge. Each socket of each flat side is adapted for slidable receiving the bead of a like flat side to secure releasably the flat sides to each other. Each flat side has a plurality of horizontal recesses with a vent in each of the recesses to allow gases to pass from one side of the flat side to the other side of the flat side. Each flat side has an indentation in its upper edge with a ridge formed integral with the flat side in the indentation. Each flat side has an ear formed integral with its lower edge mateable releasably positionable in an indentation of a like flat side. Each ear has a groove for mateably receiving the ridge in the indentation of a like flat side for locking vertically aligned flat sides to each other and thereby, lock the upper section to the lower section. A cover is removably mounted on the upper edge of the upper section to close the upper section.

BRIEF DESCRIPTION OF THE DRAWINGS

FIG. 1 is a perspective view of a plastic container embodying the herein disclosed invention showing the container positioned on a supporting surface;

FIG. 2 is a perspective view of a portion of the container of FIG. 1, showing assembly of flat sides to each other;

FIG. 3 is an enlarged cross-sectional view of a cover of the container of FIG. 1 taken on Line 3—3 of FIG. 1;

FIG. 4 is an enlarged cross-sectional view taken on Line 4—4 of FIG. 1 showing a bead and socket of adjacent identical flat sides interlocked;

FIG. 5 is an enlarged cross-sectional view taken on Line 5—5 of FIG. 1, showing an anchor used to secure the container of FIG. 1 to a supporting surface.

FIG. 6 is a perspective view showing an anchor being attached to a flat side;

FIG. 7 is an enlarged side-elevational view of a flat side;

FIG. 8 is an enlarged cross-sectional view taken on Line 8—8 of FIG. 1, showing an ear and an indentation of a pair of flat sides interlocking the flat sides vertically;

FIG. 9 is an enlarged cross-sectional view taken on Line 9—9 of FIG. 1 showing another ear and an indentation on the other side of the flat side of a pair of flat sides interlocked vertically;

FIG. 10 is an enlarged cross-sectional view taken on Line 10—10 of FIG. 1 showing a cover lock in position locking the cover to the upper section; and FIG. 11 is a perspective view of a cover lock mounted on a flat side.

DESCRIPTION OF THE PREFERRED EMBODIMENT

Referring now to the drawings and especially to FIG. 1, a plastic container generally indicated by numeral 20 is shown therein, which container is a specific embodiment of the herein disclosed invention. The plastic container 20 generally includes; a lower section 22, an upper section 24 releasably locked to the lower section, a cover 26 mounted on the upper section, a pair of identical top locks 28 releasably securing the cover to the upper section, and a plurality of anchors 30 attached to the lower section securing the container to a supporting surface.

The lower section is made up of four identical flat sides, which are identical to flat sides 32 and 34, shown in FIG. 1. The upper section is made up of four identical flat sides identical to the flat sides in the lower section, two of which flat sides 36 and 38 are shown in FIGS. 1 and 2.

As may be seen in FIG. 7, wherein flat side 32 is shown in detail, each flat side has a generally rectangular outline. Flat side 32 includes four identical parallel recesses 40, 42, 44 and 46. Recess 40 includes slots 48, 50 and 52, which pass through the flat side. Recess 42 includes slots 54, 56 and 58 identical to slots 48, 50 and 52, respectively. Recess 44 includes slots 60, 62 and 64, which are also identical to slots 48, 50 and 52, respectively. Recess 46 includes slots 66, 68 and 70, which are identical to slots 48, 50 and 52, respectively.

Flat side 32 includes an elongated bead 72 along one vertical edge, which bead is formed integral with piers 74, 76 and 78. Piers 74, 76 and 78 are formed integral with the edge of the side. The bead contains a relief slot 79 along its entire length. Three identical sockets 80, 82 and 84 are formed integral with the other vertical edge of the flat side. Each socket includes a cup portion 86 having an internal lip 88 to define a receptical portion 90, which is a portion of a circle. The receptical portion slideably and mateably receives bead 72.

The upper edge of the flat side includes three outwardly opening horizontal recesses, 92, 94 and 96. The remainder of the upper edge includes two recesses 98 and 100, which open inwardly. Each recess includes a ridge 102 formed integral with the opening facing portion of the flat side adjacent to the upper edge, which ridge is parallel to the upper edge. Recess 94 is located at the center of the upper edge and includes a top lock aperture or opening 104 positioned below each respective ridge. A bevel portion 106 is formed in the upper edge above the opening 104.

The lower edge of flat side 34 has three ears 108, 110 and 112, formed integral therewith. The ears 108, 110 and 112 are flush with the outer portion of the side and are positionable in recesses 92, 94 and 96 of an identical flat side. A pair of ears 114 and 116 is formed integral with the lower edge, and the ears are offset so that the ears may be positioned in recesses 98 and 100 when ears 108, 110 and 112 are positioned in their respective recesses. Each of the ears 108, 110, 112, 114 and 116 includes a groove 118, which releasably receives ridge 102 of the respective recess so that like flat sides are releasably locked to each other. when the ears are positioned in their respective recesses.

Cover 26 is a unitary molded plastic part having a substantially flat top 120 and a plurality of reinforcing ribs 122 formed integral with the top. A knob or handle 124 is formed integral with the top at the center thereof. A peripheral wall or edge 126 is formed integral with the outer periphery of the top. A cover lock aperture 128 is formed in opposite sides of the edge for receiving the top lock.

Top lock 28 includes a tongue 130 with a lip 132 formed integral therewith. A flat post or wall 134 is formed integral with the tongue and has a hook 136 formed integral with the upper portion thereof. A ledge 138 is formed integral with the lower portion of post 134 and extends outward from the post in a direction opposite to tongue 130. Ledge 138 includes a bead 140 on its outer portion.

Each top lock 28 is mounted on the upper portion of the flat side in the upper section by inserting the lip and tongue through ear opening 104 and then rotating the top lock so that the hook passes over the edge at bevel portion 106 to secure the top lock to the side panel. The cover is placed onto the upper portion, and the edge 126 is bowed out slightly to pass the edge over the bead of the ledge until the ledge passes through cover lock aperture 128 to secure the cover to upper edge.

Each anchor 30 is identical in construction to each other anchor. As may be seen in FIG. 5, anchor 30 is a integral part having a head 142 with a hook 144 formed thereon. A shank 146 has one end formed integral with head 142. A pair of flukes 148 and 150 is formed integral with the other end of the shank. The flukes extend outward in opposite directions. Each of the flukes 148 and 150 including tongues 152 and 154, respectively, formed integral therewith.

Anchor 30 is secured to the lower edge of a flat side by positioning the hook and head into a vent 68 and then rotating the anchor until the shank is substantially parallel to the side. The flukes of the anchor are embedded in a supporting surface to secure the anchor to the supporting surface and thereby, secure the container to the supporting surface.

The identical sides described herein are molded plastic parts which may be conveniently packaged as flat portions thereby, enabling the items to be packaged conveniently and in a minimum amount of space. The cover is substantially the same as the flat sides in configuration in its outline, so that the cover also takes up a minimum of space. It is apparent that the compost container in its knocked down attitude occupies a minimum amount of storage space, so that a retailer may conveniently store a quantity of compost containers in a minimum of space.

The construction of the compost container is such that a user of the container may readily assemble it with a minimum of effect. The user simply places the flat sides in an interlocking relationship to form a square having an open bottom. The flat sides which form the lower section are put together for sliding the bead of one of the flat sides into the elongated sockets of the adjacent side panel. Once the lower section is assembled, the upper section is assembled in the same manner. However, the ears of the upper section are interlocked with the recesses of the lower sections to lock the upper section to the lower section. It may be appreciated that the container may be made as tall as desired inasmuch as additional side panels may be added to form additional sections. The anchors 30 are secured to the lower edge of the lower section with hook 44 engaging the lower edge. The lower portion of the anchor is buried in the earth so that the container is secured and will not be easily blown over by the wind.

The top locks 28 are secured to the upper edge of the upper section by inserting each tongue 130 through its respective top lock apertures 104. The cover 26 is then mounted on the upper edge with each ledge 138 positioned in its respective cover lock aperture 128. Thus, the cover, is locked onto the upper section.

Organic matter is placed into the container and the vents allow oxygen to enter the container and to allow gases to escape from the container. The container keeps the compost in a restricted area so that the organic matter does not take up a substantial amount of space, and the wind does not disturb the compost. It is generally recognized that a compost heap is not particularly attractive. The present container removes the unsightliness of the compost heap and contains the container of the compost heap in a restricted area. Furthermore, if certain organic materials such as, fruits or vegetables are added to the compost heap, the compost heap is not disturbed by varmints, who may dig into a compost heap and spread the materials of the heap. Rather, the materials are contained in the container, and the cover is secured into position thereby discouraging varmints from disrupting the compost.

Although a specific construction of the present invention has been described in detail above and shown in the accompanying drawings, it is to be expressly understood that the instant invention is limited only by the appended claims.

What is claimed is:

1. A plastic container for holding organic matter during decomposition of said organic matter comprising: a lower section including a plurality of flat sides positioned in a substantially vertical attitude joined at opposite edges to form a closed figure having an open bottom, an upper section including an equal number of flat sides as the lower section, the flat sides of the upper section positioned in a substantially vertical attitude joined at opposite edges to form a closed figure mounted on the lower section with the respective flat sides of the upper and lower sections being vertically aligned, each of said flat sides having a rectangular outline, each of said flat sides having a bead along a vertical edge, an elongated socket formed integral with the opposite vertical edge of each of said flat sides, each socket being adapted for slidably receiving the bead of a flat side in its respective section, each of said flat sides having a plurality of horizontal recesses, a vent in each of the recesses to allow gases to pass from one side of the flat side to the other side of the flat side, each flat side having an indentation on its upper edge, a ridge formed integral with the flat side in the indentation, each of said flat sides having a flexible ear on its lower edge mateably releasably positionable in the indentation on a like flat side, each ear having a groove for mateably receiving the ridge in the indentation for locking adjacent flat sides to each other, and a cover removably engageable with the upper edge of the upper section.

2. A plastic container for holding organic matter during decomposition of said organic matter as defined in claim 1 wherein, the cover is a molded integral part having a substantially flat top, a handle formed integral with the top, and a downwardly extending wall formed integral with the outer periphery of the top adapted for engaging the upper edge of the upper section.

3. A plastic container for holding organic matter during decomposition of said organic matter as defined in claim 1 wherein, the cover includes a peripheral wall extending over the upper edge of the upper portion, and including a lock releasably securing the cover to a flat side, each flat side having a top lock aperture adjacent to its upper edge, said lock including a tongue positioned in a top lock aperture of one of the flat sides of the upper section, a post formed integral with the tongue and extending upward to the upper edge of the respective flat side, a hook formed integral with the post and extending over the upper edge of the flat side, and a ledge formed integral with the post and extending away from the tongue, and said cover wall having a cover lock aperture releasably receiving a portion of the ledge to secure the wall of the cover to the flat side.

4. A plastic container for holding organic matter during decomposition of said organic matter as defined in claim 1 including, an anchor secured to one of the flat sides of the lower section and being particularly adapted for being embedded in a supporting material to secure the container to the supporting material, said anchor including a head hook adapted for being positioned in a vent adjacent to the lower edge of a flat side of the lower section, a shank having one end formed integral with the head hook and extending beyond the lower edge of the respective flat side, and a pair of flukes formed integral with the other end of the shank and extending generally outward.

5. A plastic container for holding organic matter during decomposition of said organic matter as defined in claim 1 wherein, the cover is a molded plastic integral part having a substantially flat top, a handle formed integral with the flat top, and a downwardly extending wall formed integral with the outer periphery of the top adapted for engaging the upper edge of the upper section, each flat side having a top lock aperture adjacent to its upper edge; and a lock including a tongue positioned in a top lock aperture of one of the flat sides of the upper section, a post formed integral with the tongue and extending upward to the upper edge of the respective flat side, a hook formed integral with the post and extending over the upper edge of the flat side, and a ledge formed integral with the post and extending away from the tongue; and said cover wall having a cover lock aperture releasably receiving a portion of the ledge to secure the cover wall to the flat side.

6. A plastic container for holding organic matter during decomposition of said organic matter as defined in claim 1 wherein, the cover is a molded integral plastic part having a substantially flat top, a handle formed integral with the top adjacent to the center thereof, and a downwardly extending wall formed integral with the outer periphery of the top adapted for engaging the outer portion of the upper edge of the upper section, and including an anchor secured to one of the flat sides of the lower portion, said anchor including a head hook positioned in a vent adjacent to the lower edge of a flat side of the lower section, a shank having one end formed integral with the head hook and extending beyond the lower edge of the respective flat side, and a pair of flukes formed integral with the other end of the shank and extending outward to be embedded in a material supporting the lower section to secure the container to the supporting material.

7. A plastic container for holding organic matter during decomposition of said organic matter as defined in claim 1 wherein, the cover includes a peripheral wall extending over the upper edge of the upper section, said peripheral wall having a cover lock aperture contained therein; and including a lock releasably securing the cover to a flat side, each flat side having a top lock aperture adjacent to its upper edge, said lock including a tongue positioned in a top lock aperture of one of the flat sides of the upper section, a post formed integral with the tongue and extending upward to the upper edge of the respective flat side, a hook formed integral with the post and extending over the upper edge of the flat side, and a ledge formed integral with the post and extending away from the tongue to be selectively positioned in the cover lock aperture of the cover for releasably securing the cover to the flat side.

8. A plastic container for holding organic matter during decomposition of said organic matter as defined in claim 1 wherein, the cover is a molded integral plastic part having a substantially flat top, a handle formed integral with the top adjacent to the center thereof and extending outwardly therefrom, and a downwardly extending wall formed integral with the outer periphery of the top and adapted for engaging the upper edge of the upper portion, said downwardly extending wall of the cover including a cover lock aperture; each of said flat sides having a top lock aperture adjacent to its upper edge; a lock including a tongue positioned in the top lock aperture of one of the flat sides of the upper section, a post formed integral with the tongue and extending upward to the upper edge of the respective flat side, a hook formed integral with the post and extending over the upper edge of the flat side, and a ledge formed integral with the post and extending away from the hook and being positioned in the cover lock aperture of the downwardly extending wall of the cover to secure releasably the cover to the respective flat side; and an anchor including a head hook positioned in a vent adjacent to the lower edge of a flat side of the lower section, a shank having one end formed integral with the head hook and extending below the lower edge of the respectiv flat side, and a pair of flukes formed integral with the other end of the shank and extending outwardly for holding the anchor embedded in a material supporting the lower portion to secure the lower portion to the supporting material.

9. A plastic container for holding organic matter during decomposition of said organic matter as defined in claim 1 including, a cover lock connected to the upper edge of a flat side of the upper section and being releasably engageable with the cover to secure releasably the cover to the flat side.

10. A plastic container for holding organic matter during decomposition of said organic matter as defined in claim 1 including, an anchor secured to a flat side of the lower section and extending below the lower edge of the flat side to be embedded in material supporting the flat side to secure the flat side to the supporting material.

11. A plastic container for holding organic matter during decomposition of said organic matter as define in claim 1 including, a cover lock connected to the upper edge of a flat side of the upper section and being releasably engageable with the cover to secure releasably the cover to the flat side, and an anchor secured to a flat side of the lower section and extending below the lower edge of said flat side to be embedded in a material supporting the flat side to secure the flat side and the container to the supporting material.

12. A plastic container for holding organic matter during decomposition of said organic matter comprising; a lower section including four flat interconnected sides positioned in a substantially vertical attitude joined at opposite edges to form a closed figure having an open bottom, an upper section including four flat sides positioned in a substantially vertical attitude joined at opposite edges to form a closed figure mounted on the lower section with the respective flat sides of the upper and lower portions being vertically aligned, each of said flat sides having a rectangular outline, each of said flat sides having a continuous bead along a vertical edge, a plurality of elongated sockets aligned with each other formed integral with the opposite vertical edge of each of said sides, each of said plurality of aligned sockets being adapted for slidably receiving the bead of a side in its respective section, each of said flat sides having a plurality of horizontal recesses, a plurality of vents in each of the recesses of each flat side to allow gases to pass from one side of the flat side to the other side of the flat side, each of said flat sides having a plurality of indentations on its upper edge, each of the indentations on the upper edge of each side facing in the opposite direction of its adjacent indentation, a ridge formed integral with the flat side in each indentation, each ridge being parallel to the upper edge of the flat side, a plurality of flexible ears equal in number to the plurality of indentations formed integral with the lower edge of each side for being mateably releasably positioned in the indentation of a like flat side, each ear of each side having a groove for mateably receiving the ridge of the respective indentation for locking adjacent flat sides to each other, and each flat side having a top lock aperture adjacent to its upper edge; a cover removably engageable with the upper edge of the upper portion, said cover being a molded integral plastic part having a substantially flat top, a handle formed integral with the flat top at its center, a downwardly extending wall formed integral with the outer periphery of the top and being adapted for engaging the upper edge of the upper section, and said wall having a plurality of cover lock apertures contained therein; a lock releasably securing the cover to a flat side, said lock including a tongue positioned in a top lock aperture of one of the flat sides of the upper section, a post formed integral with the tongue and extending upward to the upper edge of the respective flat side, a hook formed integral with the post and extending over the upper edge of the flat side, and a ledge formed integral with the post and extending away from the tongue positioned in a cover lock aperture in the cover wall to secure the cover to the flat side; and an anchor secured to one of the flat sides of the lower section being adapted to be embedded in a supporting surface to secure the container to the supporting surface, said anchor including a head hook positioned in a vent adjacent to the lower edge of a flat side of the lower section, a shank having one end formed integral with the head hook and extending below the lower edge of the respective flat side, a pair of flukes formed integral with the other end of the shank and extending outward, and each of said flukes including an arm extending outward from the shank and a tongue formed integral with each arm.

* * * * *